Patented Oct. 31, 1944

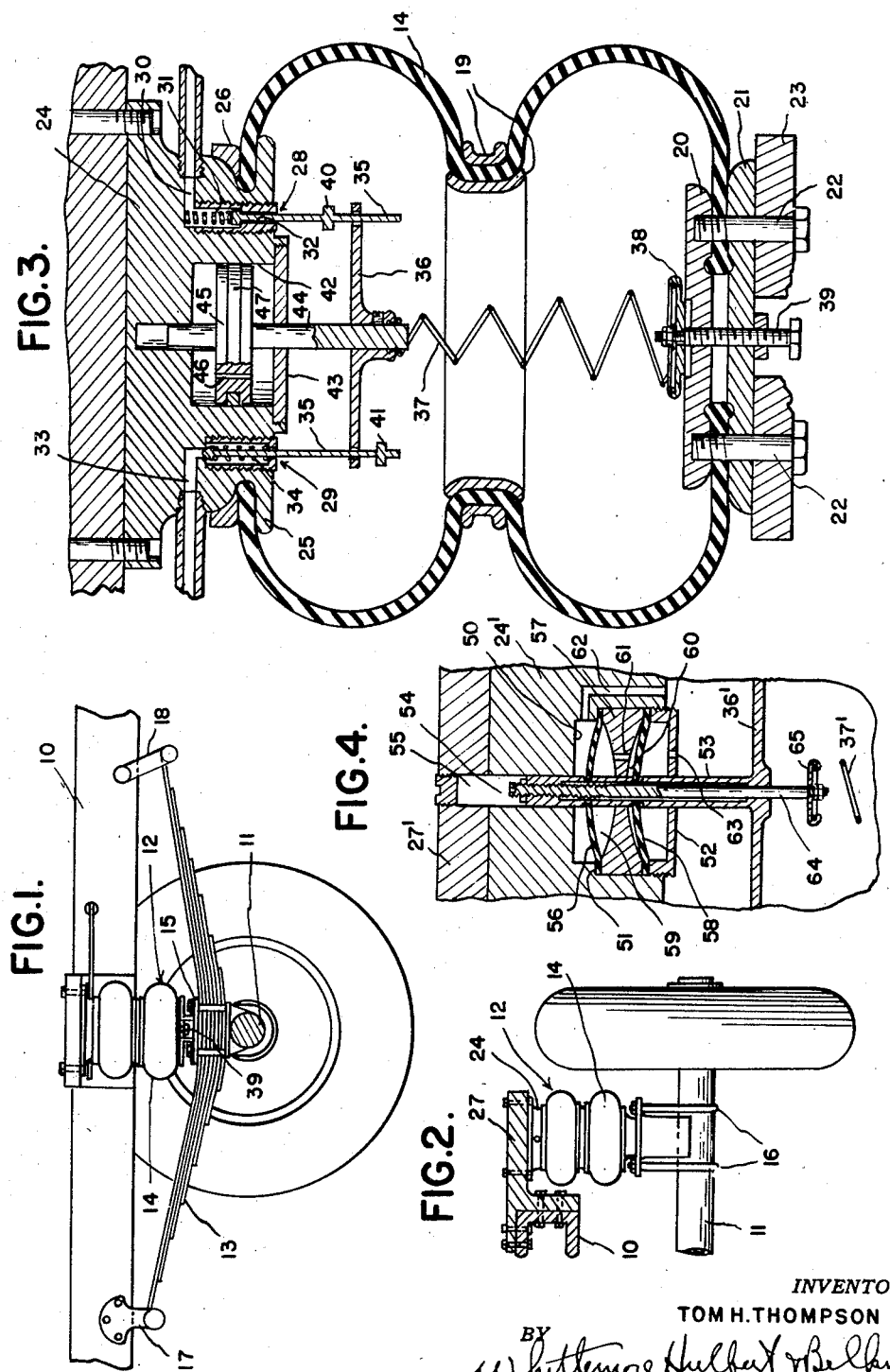

2,361,575

UNITED STATES PATENT OFFICE 2,361,575

SUSPENSION SYSTEM FOR VEHICLES

Tom H. Thompson, Detroit, Mich., assignor to Builder-Thompson Engineering and Research Corporation, a corporation of Michigan Application October 13, 1941, Serial No. 414,879

7 Claims. (Cl. 267—65)

This invention relates generally to suspension systems for vehicles and refers more particularly to improvements in pneumatic suspension systems.

It is well established that within limitations imposed by design considerations of other parts of a vehicle, the suspension should produce the lowest possible natural frequency of body oscillation and this frequency should remain constant under varying service conditions. Considerable research work has been devoted in the past to the solution of the problem of providing a vehicle suspension system having the characteristics required to provide the optimum ride regardless of road and load variations.

One method which has achieved considerable recognition is the use of an air spring suspension system to support the sprung weight of a vehicle on the unsprung weight. The numerous advantages of this general type of suspension are a matter of record in many scientific journals and papers dealing with suspension problems. Accordingly, these advantages need not be discussed here, except to point out that fundamentally pneumatic suspension possesses inherent characteristics far superior to the various different types of metal springs and appears to be the most logical development for the much needed improvements in vehicle suspension.

Prior designs of pneumatic suspension systems have not achieved commercial success because these systems were not entirely automatic in operation. In most cases it was necessary for the operator to keep the units inflated to the proper degree so the proper wheel travel required for satisfactory riding quality is obtained, regardless of load or other contributing factors.

It is, therefore, one of the principal objects of the invention to resiliently support the load represented by the sprung weight of a vehicle by an air cushion device having means for automatically varying the volume and pressure of the air in the air cushion in direct proportion to the static vehicle load. More particularly the air cushion device embodies an automatic leveling valve which introduces air into the air cushion in proportion to an increase in static load and exhausts air from the cushion in proportion to decreases in static load. As a result, the optimum ride can be designed into the vehicle by merely taking into account the unloaded weight figures and the chassis or sprung weight of the vehicle will ride at the same predetermined curb height regardless of pay load variations. In other words, the useful deflection or axle movement required for the most satisfactory ride is maintained constant even though the pay load varies to an appreciable extent.

A further object of this invention is to provide an air cushion device of the above type having means for damping the action of the leveling valve to such an extent that the latter will not function to either admit air into or exhaust the same from the air cushion during normal axle movement due to road irregularities.

Still another feature of this invention is to provide an air cushion device which may be used as the sole load support or may be employed as an auxiliary suspension means in combination with the usual metal springs. In this latter case the primary or metal spring would be designed to carry the unloaded weight of the vehicle and the air suspension system would be designed to carry the pay load.

The foregoing, as well as other objects, will be made more apparent as this description proceeds especially when considered in connection with the accompanying drawing wherein:

Figure 1 is a sectional view illustrating a portion of a vehicle equipped with a suspension system constructed in accordance with this invention;

Figure 2 is a rear elevational view partly in section of the portion of the vehicle shown in Figure 1;

Figure 3 is a longitudinal sectional view through the air cushion of the suspension system; and Figure 4 is a sectional view showing a slightly modified form of construction.

Referring now to the drawing, it will be noted that in Figures 1 and 2 I have shown a portion of a vehicle having load supporting means 10 and have ground engaging wheel supporting means in the form of an axle 11. The load supporting means 10 may be considered to include what is commonly known in the art as a spring assembly.

The assembly 10 is supported on the axle 11 by means of a suspension system 12 comprising a metal leaf spring 13 and an air cushion 14. In the present instance the leaf spring 13 is designed to support the unloaded weight of the assembly 10 and the air cushion 14 is adapted to support the pay load on the assembly 10.

Before describing the suspension system in detail, it is desired to point out that the air cushion 14 may be employed as the sole support for both the unloaded weight of the assembly 10 and the pay load without the assistance of the metal leaf spring 13. In fact, the only purpose for illustrating the metal leaf spring 13 is to show that the air cushion 14 may be combined with conventional suspension systems to correct the many well known defects of the latter type of suspension system. It should be noted, however, that the use of the combination of the air cushion 14 and the leaf spring 13 is advantageous because the leaf spring 13 will act as an emergency support in the event of failure of the air cushion 14.

With the above in mind reference will now be made more in detail to the suspension system 12. Upon reference to Figure 1, it will be noted that the central portion of the leaf spring 13 is clamped to the axle 11 and the opposite ends of the spring are respectively pivotally connected to the assembly 10. The central portion of the spring 13 is clamped to the axle 11 by means of a top plate 15 and a pair of U-shaped clamping bolts 16. One end of the spring 13 is pivoted directly to a bracket 17 which is secured to the assembly 10 and the opposite end of the spring 13 is connected to the assembly 10 by means of a shackle 18. It will, of course, be understood that a spring 13 is mounted on each end of the axle 11 and these springs cooperate to support the unloaded weight of the assembly 10.

The air cushion 14 is located between the central portion of the spring 13 and the assembly 10 to support the pay load on the assembly 10. The air cushion comprises a tube formed of rubber or a substitute for rubber. The tube has a constricted waist portion intermediate its ends formed by a pair of metal constricting rings 19. The lower end of the tube is closed by a pair of plates 20 and 21 which cooperate with one another to clamp the lower end portions of the tube therebetween.

Upon reference to Figure 3, it will be noted that the two plates are clamped together with the lower end portions of the tube therebetween by means of a pair of bolts 22. The bolts 22 are carried by a plate 23 and the latter is secured in any suitable manner to the plate 15.

The upper end of the tube is closed by a plate 24 having a radially outwardly extending flange 25 at its lower end and adapted to extend into the upper end of the tube. The upper end portion of the tube is clamped against the top surface of the flange 25 by means of a sealing ring 26 in such a manner that air is prevented from escaping out of the upper end of the tube. The plate 24 is secured to a bracket 27 and the latter is in turn secured to the assembly 10.

It follows from the above that the tube cooperates with the closures at opposite ends thereof to form a chamber. This chamber contains air under sufficient pressure to support the assembly 10 at a predetermined standing height regardless of the pay load on the assembly 10. Inasmuch as the load on the assembly 10 may vary substantially, provision is made herein for automatically varying the volume and pressure of the air in the air cushion to compensate for changes in the load.

In general when the load on the assembly 10 is increased, a sufficient quantity of additional air is automatically introduced into the air cushion to compensate for the additional load and thereby restore the assembly 10 to its normal or predetermined standing height. When, on the other hand, a load on the assembly 10 is decreased, provision is made herein for exhausting sufficient air from the air cushion to compensate for the decrease in load and thereby restore the assembly 10 to a desired predetermined standing height. This is very important because it renders it possible to provide and maintain the degree of axle movement required to obtain the most satisfactory ride regardless of changes in the load.

In the present instance the above is accomplished by an intake valve 28 and an exhaust valve 29. The intake valve 28 is slidably supported in the plate 24 and controls an air intake passage 30 which communicates with a source of air under pressure not shown here. The intake valve is normally held in its closed position by means of a coiled spring 31 and is provided with an outlet passage 32 which communicates with the interior of the air cushion. The construction of the intake valve 28 is such that the latter must be moved in an upward direction against the action of the spring 31 to establish communication between the intake passage 30 and the outlet passage 32.

The exhaust valve 29 is also slidably mounted in the plate 24 and controls an outlet passage 33 formed in the plate 24. The valve 29 is normally held in a position wherein the outlet passage 33 is closed by means of a coil spring 34 in such a manner that the valve 29 must be moved downwardly against the action of the spring 34 to establish communication between the interior of the air cushion and the outlet passage 33.

The two valves are automatically operated by a member 36 supported in the air cushion on the upper end of a coil spring 37 having the lower end seated on a washer 38. The washer 38 is mounted on the upper end of a screw 39 having a shank portion threaded in aligned openings formed in the two plates 20 and 21. The lower end of the screw 39 extends below the bottom plate 21 through an opening formed in the plate 23 and is provided with a head adapted to be engaged by a suitable tool for the purpose of adjusting the compression of the spring 37.

The member 36 is operatively connected to both valves by a pair of valve stems 35 respectively extending downwardly into the air cushion from the intake and exhaust valves. As shown in Figure 3, the intake valve stem extends freely through an opening in the member 36 and is provided with an enlargement 40 normally spaced above the member 36. The exhaust valve stem also extends freely through an opening in the member 36 and is provided with an enlargement 41 normally spaced below the member 36.

Attention is called at this time to the fact that the member 36 is movable upwardly and downwardly relative to the plate 24. In detail the plate 24 is formed with a downwardly opening recess 42 closed at its lower end by a closure 43 having a central opening therethrough for receiving a plunger 44 having the lower end secured to the member 36. A piston 45 is secured to the plunger 44 in the recess 42 and a restricted port 46 extends through the piston. A piston ring 47 is mounted on the piston to seal the space above the piston from the space below the latter. The arrangement is such that movement of the piston in opposite directions in the recess 42 displaces air from the space at one side of the piston through the restricted passage 46 to the space at the opposite side of the piston. Inasmuch as the member 36 is connected to the piston for movement therewith as a unit, it follows that movement of the member 36 is damped to a degree depending on the rate of flow of air through the restricted port 46. This damping action is important because it prevents the impulses imparted to the spring 37 by normal running oscillations of the axle from moving the member 36 sufficiently to operate either of the valves.

With the construction described above it will be noted that an increase in the load on the assembly 10 causes a compression of the air cushion and engages the enlargement 40 on the intake valve stem 35 with the member 36. As compression of the air cushion continues, the intake valve is opened and air under pressure from the source of supply is admitted to the air cushion. In this manner the pressure of the air in the air cushion is increased sufficiently to compensate for the increase in load and the assembly 10 is restored to its normal predetermined standing height. As the air cushion is extended by the increased air pressure, the intake valve is closed by the spring 31. It is pointed out at this time that during compression of the air cushion, the spring 37 is compressed to a greater extent and the piston 45 together with the member 36 are moved upwardly relative to the plate 24 or assembly 10. On the other hand, when the assembly 10 is restored to its normal standing height, the compressive force on the spring 37 is relieved to some extent and the piston 45 with the member 36 are restored to their normal positions wherein the enlargement 40 is again spaced above the member 36.

Assuming now that the load on the assembly 10 is reduced, the air cushion is extended to such an extent that the enlargement 41 engages the member 46 and opens the exhaust valve 29 to reduce the pressure in the air cushion sufficiently to restore the assembly 10 to its normal standing height. When sufficient air has been exhausted from the air cushion to restore the assembly 10 to its normal standing height, the exhaust valve 29 is closed and remains closed until the pay load is again decreased. It will be noted that as the air cushion is extended to compensate for the reduced load, the member 36 together with the piston are moved downwardly relative to the plate 24 or assembly 10. As a result, when the assembly 10 is lowered by reducing the air pressure in the air cushion, the piston 45 together with the member 36 are returned to their normal positions shown in Figure 3 wherein the enlargement 41 is spaced below the member 36.

The spacing of the enlargements from opposite sides of the member 36 is important because it permits limited oscillation of the member 36 between the enlargements without operating the valves. When considering that this oscillation of the member 36 is also effectively retarded by the damping means, it will be seen that normal axle movements caused by road irregularities does not effect either the intake or exhaust valves.

In addition, it will be noted that the above construction renders it possible to automatically vary the volume nad pressure of the air in the air cushion in direct proportion to changes in the static load on the assembly 10. As a result, only the unloaded weight characteristics of the vehicle need be taken into consideration in providing the optimum ride and the latter will remain exactly the same throughout the range of loads imposed on the assembly 10 of the vehicle.

The embodiment of the invention illustrated in Figure 4 differs from the above described construction in that a fluid operated damping means is employed and in that provision is made for adjusting the compression of the spring from the top of the air cushion. In detail the plate 24' on the assembly 10 is formed with a downwardly opening recess 50 having an annular internal shoulder 51 intermediate the ends thereof and having the open end closed by a cap 52 threaded into the open end of the recess.

The valve operating member 36' is provided with a tubular extension 53 which projects upwardly through the closure 52 and recess 51 into a bore 54 formed in the plate 24' in registration with a bore 55 extending through the attaching bracket 27'. A flexible diaphragm 56 is secured at its center to the tubular extension 53 and the periphery of the diaphragm 56 is clamped against the annular shoulder 51 by means of a partition 57 located in the recess 50 intermediate the ends thereof. A second diaphragm 58 is secured at its center to the tubular extension 53 below the partition and has its periphery clamped against the partition by the cap 52.

The top diaphragm 56 cooperates with the top surface of the partition 57 to form a chamber 59 and the bottom diaphragm 58 cooperates with the underside of the partition to form a second chamber 60. The two chambers are filled with a hydraulic fluid and communicate with each other through a restricted port 61. The space above the top diaphragm 56 communicates with the interior of the air cushion through a passage 62 in the plate 24' and the space at the under side of the bottom diaphragm 58 communicates with the interior of the air cushion through a port 63 in the cap 52. As a result, the same pressure is present in the spaces above and below the diaphragms. It follows, therefore, that movement of the member 36' relative to the air cushion in an upward direction displaces fluid from the lower chamber 60 through the restricted port 61 in the partition 57 into the top chamber 59. On the other hand, movement of the member 36' relative to the air cushion in a downward direction displaces fluid from the top chamber 59 through the port 61 into the bottom chamber 60. The rate of transfer of the fluid from one chamber to the other is controlled by the restricted port 61 and the damping action is dependent upon the degree of restriction of the port 61.

It has previously been stated that the compression of the spring 37' is adjusted from the top of the air cushion. In detail a rod 64 extends upwardly through the tubular extension 53 and has the upper end in the corresponding end of the extension. A washer 65 is secured to the lower end of the rod and engages the top of the spring 37'. The construction is such as to enable the rod and accordingly the spring 37' to be adjusted by inserting a suitable tool through the registering bores 54 and 55 into engagement with the upper end of the rod.

What I claim as my invention is:

1. In a vehicle equipped with ground engaging wheel supporting means and with load supporting means having a predetermined standing height, an air cushion comprising a collapsible container located between said ground engaging wheel supporting means and said load supporting means for resiliently supporting the load at said predetermined height, a valve controlling the admission of air into the air cushion, a second valve for exhausting air from the interior of the air cushion, and a member housed by the air cushion and respectively movable in opposite directions upon expansion and contraction of the air cushion, and operative connections between the member and valves for respectively opening the first and second valves upon a predetermined movement of the member in opposite directions to thereby vary the volume and pressure of the air in the air cushion sufficiently to maintain the load supporting means at said predetermined standing height regardless of the changes in the load on the load supporting means.

2. In a vehicle equipped with ground engaging wheel supporting means and with load supporting means having a predetermined standing height, an air cushion between said ground engaging wheel supporting means and said load supporting means for resiliently supporting the load at said predetermined height, a valve controlling the admission of air into the air cushion, a second valve for exhausting air from the interior of the air cushion, a member supported in the air cushion for movement relative thereto in response to changes in the static load on the load supporting means, a lost motion connection between the intake valve and member for opening the intake valve upon a predetermined increase in the static load, and a lost motion connection between the exhaust valve and member for opening the exhaust valve upon a predetermined decrease in the static load.

3. In a vehicle equipped with ground engaging wheel supporting means and with load supporting means having a predetermined standing height, an air cushion between said ground engaging wheel supporting means and said load supporting means for resiliently supporting the load at said predetermined height, a valve controlling the admission of air into the air cushion, a second valve for exhausting air from the interior of the air cushion, a member supported in the air cushion for movement in one direction relative thereto in response to compression of the air cushion caused by an increase in the static load on the load supporting means and for movement relative to the air cushion in the opposite direction in response to extension of the air cushion caused by a decrease in the static load, a lost motion connection between the air intake valve and member for opening the intake valve upon an increase in the static load, a second lost motion connection between the exhaust valve and member for opening the exhaust valve upon a decrease in the static load, and means for damping movement of said member in both of said directions relative to the air cushion.

4. In a vehicle equipped with ground engaging wheel supporting means and with load supporting means having a predetermined standing height, an air cushion between said ground engaging wheel supporting means and said load supporting means for resiliently supporting the load at said predetermined height, a valve controlling the admission of air into the air cushion, a second valve for exhausting air from the interior of the air cushion, a member supported in the air cushion for movement relative to the latter in an upward direction in response to compression of the air cushion caused by an increase in the static load on the load supporting means and for movement in a downward direction relative to the air cushion in response to extension of the air cushion caused by a decrease in the static load, a stem on the intake valve extending downwardly into the air cushion through an opening in said member and having a shoulder engageable with the member upon a predetermined compression of the air cushion to open the intake valve, and a stem on the exhaust valve extending downwardly into the air cushion through an opening in the member and having a shoulder engageable with said member upon a predetermined extension of the air cushion to open the exhaust valve, said shoulders being normally spaced from said member to allow for a limited movement of the member in both directions relative to the air cushion without operating said valves.

5. In a vehicle equipped with ground engaging wheel supporting means and with load supporting means having a predetermined standing height, an air cushion between said ground engaging wheel supporting means and said load supporting means for resiliently supporting the load at said predetermined height, a valve controlling the admission of air into the air cushion, a second valve for exhausting air from the interior of the air cushion, a member supported in the air cushion for movement relative to the latter in an upward direction in response to compression of the air cushion caused by an increase in the static load on the load supporting means and for movement in a downward direction relative to the air cushion in response to extension of the air cushion caused by a decrease in the static load, a coil spring supported between the member and ground engaging wheel supporting means for actuating said member in response to changes in the static load on the load supporting means, a stem on said intake valve extending downwardly through an opening in the member and having a shoulder engageable with the member upon compression of the air cushion to open the intake valve, a stem on the exhaust valve extending downwardly into the air cushion through an opening in said number and having a shoulder engageable with the member upon extension of the air cushion to open the exhaust valve, said shoulders being normally spaced from said member to allow for a limited movement of said member relative to the air cushion in both directions aforesaid without operating the valves, and means for damping movement of the member relative to the air cushion in both directions from the normal position thereof.

6. In a vehicle equipped with ground engaging wheel supporting means and with load supporting means having a closed chamber, an air cushion between the ground engaging wheel supporting means and the load supporting means for resiliently supporting the load, a valve controlling the admission of air into the air cushion, an exhaust valve for exhausting air from the interior of the air cushion, a member supported in the air cushion for movement relative thereto in upward and downward directions in response to changes in the load on the load supporting means, a connection between the member and air intake valve for opening the latter upon an increase in the load on the load supporting means, a connection between the member and exhaust valve for opening the latter upon a decrease in the load on the load supporting means, and means for damping the action of the member including a ported piston reciprocably mounted in the chamber and having a connection with said member.

7. In a vehicle equipped with ground engaging wheel supporting means and with load supporting means having a downwardly opening chamber, an air cushion located between the ground engaging wheel supporting means and the load supporting means to resiliently support the load, a member supported in the air cushion for movement relative thereto in upward and downward directions in response to changes in the load on the load supporting means, means responsive to movement of the number relative to the air cushion in opposite directions to respectively admit air into and exhaust air from the air cushion, means for damping movement of the member relative to the air cushion in both of said directions including a plate supported in the chamber intermediate the ends of the latter and having a passage therethrough, flexible diaphragms cooperating with opposite sides of the plate to form fluid compartments and having the central portions fixed with respect to the member for movement with the latter, a closure for the open lower end of the chamber having a port communicating with the interior of the air cushion, and a passage establishing communication between the interior of the air cushion and the space in the chamber above the top diaphragm.

TOM H. THOMPSON.